(12) United States Patent
Park et al.

(10) Patent No.: US 11,647,495 B2
(45) Date of Patent: May 9, 2023

(54) SEQUENCE GENERATION AND ASSIGNMENT

(71) Applicant: QUALCOMM Incorporated, San Diego, CA (US)

(72) Inventors: Seyong Park, San Diego, CA (US); Pinar Sen, San Diego, CA (US); Jay Kumar Sundararajan, San Diego, CA (US); Joseph Binamira Soriaga, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 16/131,966

(22) Filed: Sep. 14, 2018

(65) Prior Publication Data

US 2019/0110295 A1  Apr. 11, 2019

Related U.S. Application Data

(60) Provisional application No. 62/569,409, filed on Oct. 6, 2017.

(51) Int. Cl.
*H04W 72/044* (2023.01)
*H04L 1/08* (2006.01)
(Continued)

(52) U.S. Cl.
CPC ....... *H04W 72/0466* (2013.01); *H04L 1/0056* (2013.01); *H04L 1/08* (2013.01);
(Continued)

(58) Field of Classification Search
None
See application file for complete search history.

(56) References Cited

U.S. PATENT DOCUMENTS

| | | | | |
|---|---|---|---|---|
| 2006/0062185 | A1* | 3/2006 | Darwood | H04J 13/107 370/335 |
| 2008/0291945 | A1* | 11/2008 | Luo | H04J 11/0069 370/509 |
| 2016/0337103 | A1* | 11/2016 | Kim | H04W 72/0446 |

FOREIGN PATENT DOCUMENTS

| | | |
|---|---|---|
| WO | 08098221 | 8/2008 |
| WO | 2009023792 A1 | 2/2009 |

OTHER PUBLICATIONS

3GPP Draft; 25.213-212, 3rd Generation Partnership Project (3GPP), Mobile Competence Centre; 650, Route Des Lucioles; F-06921 Sophia-Antipolis Cedex; France, vol. RAN WG1, No. Hannover; Jul. 21, 1999, Jul. 21, 1999, XP050089617, 30 pages, [retrieved on Jul. 21, 1999].

(Continued)

*Primary Examiner* — Chi H Pham
*Assistant Examiner* — Raul Rivas
(74) *Attorney, Agent, or Firm* — Haynes and Boone, LLP

(57) ABSTRACT

The present disclosure describes the generation of long sequences from short sequences to support concurrent transmissions of large numbers of machine-type communication devices operating in a wireless communication system. These long sequences may be assigned to devices so that the devices can use the long sequences scramble their transmissions. The use of such long sequences permits many machine-type communication devices to transmit during the same time and frequency resource.

26 Claims, 10 Drawing Sheets

(51) Int. Cl.
*H04L 27/26* (2006.01)
*H04L 1/00* (2006.01)
*H04L 5/00* (2006.01)
*H04L 25/03* (2006.01)
*H04L 27/38* (2006.01)
*H04W 4/70* (2018.01)

(52) U.S. Cl.
CPC ...... *H04L 5/0019* (2013.01); *H04L 25/03866* (2013.01); *H04L 27/2602* (2013.01); *H04L 27/2684* (2013.01); *H04L 27/3872* (2013.01); *H04W 4/70* (2018.02)

(56) References Cited

OTHER PUBLICATIONS

International Search Report and Written Opinion—PCT/US2018/053447—ISA/EPO—dated Dec. 17, 2018.

\* cited by examiner

UE 1 — SHORT SCRAMBLING SEQ. SS1 ···
UE 2 — SHORT SCRAMBLING SEQ. SS2 ···
UE 3 — SHORT SCRAMBLING SEQ. SS3 ···
UE 4 — SHORT SCRAMBLING SEQ. SS4 ···
UE 5 — SHORT SCRAMBLING SEQ. SS5 ···
UE 6 — SHORT SCRAMBLING SEQ. SS6 ···
UE 7 — NO AVAILABLE SEQUENCE

AFTER THE EXTENSION, EACH SHORT SEQUENCE CAN BE MULTIPLIED WITH COMPLEX NUMBERS

FIG. 4C

UE(i) PER ROW, 1 ≤ i ≤ 6: TIME INSTANCE/
SLOT PER COLUMN

FIG. 7A

| | | | |
|---|---|---|---|
| 1 | 1 | 2 | EXTENSION PATTERN 1 |
| 1 | 2 | 3 | EXTENSION PATTERN 2 |
| 2 | 1 | 1 | |
| 3 | 6 | 2 | |
| 4 | 5 | 5 | .... |
| 5 | 4 | 6 | |
| 6 | 3 | 4 | |

UE(i) PER ROW, 1 ≤ i ≤ 6; TIME INSTANCE/SLOT OF
AN EXTENSION PATTERN PER COLUMN

FIG. 7B

SEQUENCE GENERATION AND ASSIGNMENT

CROSS REFERENCES

The present application for patent claims priority to U.S. Provisional Patent Application No. 62/569,409 by Seyong Park, et al., entitled "SEQUENCE GENERATION AND ASSIGNMENT," filed Oct. 6, 2017, assigned to the assignee hereof.

BACKGROUND

Field

Aspects of this disclosure relate generally to wireless communication systems, and more specifically, to techniques related to the generation and assignment of sequences for multiplexing multiple devices operating within a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

Scrambling sequences may have multiple purposes in a wireless communication system. On the downlink, scrambling sequences may be used to uniquely code information for an intended recipient on a physical transmission channel that may be shared with other devices. On the uplink, scrambling sequences may be used by multiple devices to uniquely channelize their data stream so that a network entity can also identify the transmitting device. Wireless communication systems preferably use scrambling sequences with low cross-correlation properties, such as pseudo-random codes or orthogonal codes, so that a scrambling sequence that is used at a transmitter can be used to uniquely descramble a signal received at a receiver.

Since the number of scrambling codes in a system is limited, the system can run out of available codes if there is a large number of devices operating at the same time. This may be referred to as a "code-limited" situation. Although there exist ways of creating more codes by using different formulas, these techniques significantly increase the overall interference level in the system and requires more hardware complexity for certain device types that are intended to be simple, low power, low complexity devices intended for machine-type communications. There is a current need to design codes that can be easily generated by such devices but can still allow such devices to coexist in a 5G NR network environment along with a wide range of other device types.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus in a wireless communications system, comprising: a sequence generator unit for generating a long scrambling sequence from a predetermined number of short scrambling sequences, wherein the long scrambling sequence is generated by concatenating the predetermined number of short scrambling sequences according to an assigned extension pattern; and a scrambling unit configured to receive the long scrambling sequence from the generator and to scramble a channel symbol stream with the received long scrambling sequence.

Certain aspects of the present disclosure provide a method for scrambling a channel symbol stream in a wireless communications system, comprising: concatenating a predetermined number of short scrambling sequences in accordance with an assigned extension pattern to form a long scrambling sequence; and scrambling the channel symbol stream using scrambling symbols of the long scrambling sequence.

Certain aspects of the present disclosure provide a method for generating a scrambling sequence in a wireless communications system, comprising: determining a set of short scrambling sequences; determining a plurality of extension patterns; and determining a plurality of long scrambling sequences, each long scrambling sequence being determined by concatenating short scrambling sequences of the set of short scrambling sequences according to each extension pattern of the plurality of extension patterns.

BRIEF DESCRIPTION OF THE DRAWINGS

FIG. 4a is an example of situation where a predetermined number of short sequences (e.g. 6) are inadequate to support the operation of an additional UE.

FIG. 4b illustrates an embodiment of the present disclosure for generating a scrambling sequence.

FIG. 4c illustrates another embodiment of the present disclosure for generating a scrambling sequence.

FIGS. 7a and 7b illustrate an example of arranging short sequences according to a set of extension patterns.

DETAILED DESCRIPTION

Figure 1:
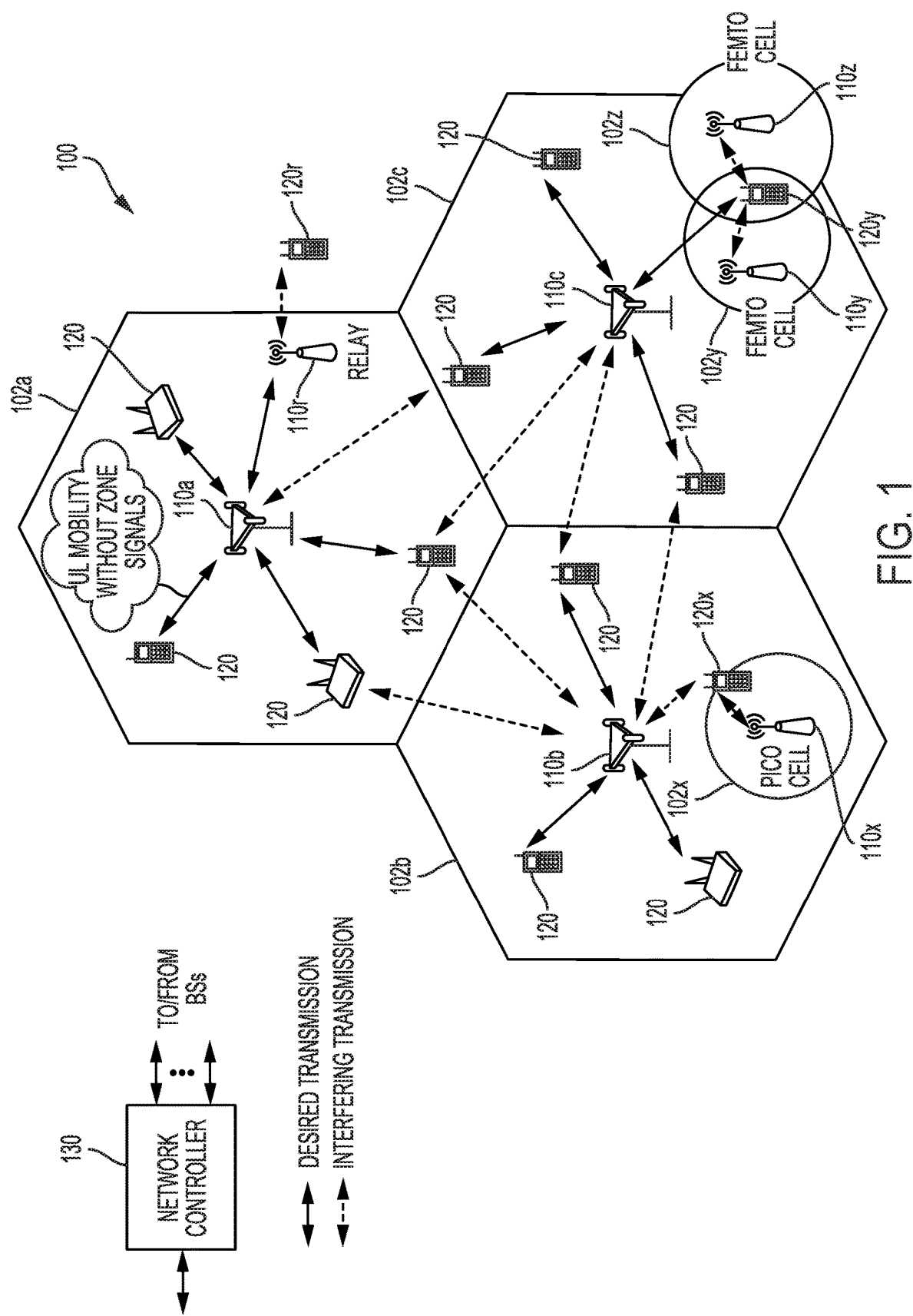
FIG. 1 illustrates an example wireless communication network with base stations (BSs) and a plurality of user equipment (UE).

5G NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 with base stations (BSs) and a plurality of user equipment (UE), in which aspects of the present disclosure may be practiced.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices or massive MTC (mMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC/eMTC/mMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a configurable sub-carrier bandwidth over a subframe duration. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, gNB, 5G Node B, Node B, transmission reception point (TRP), access point (AP)) may correspond to one or multiple BSs. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
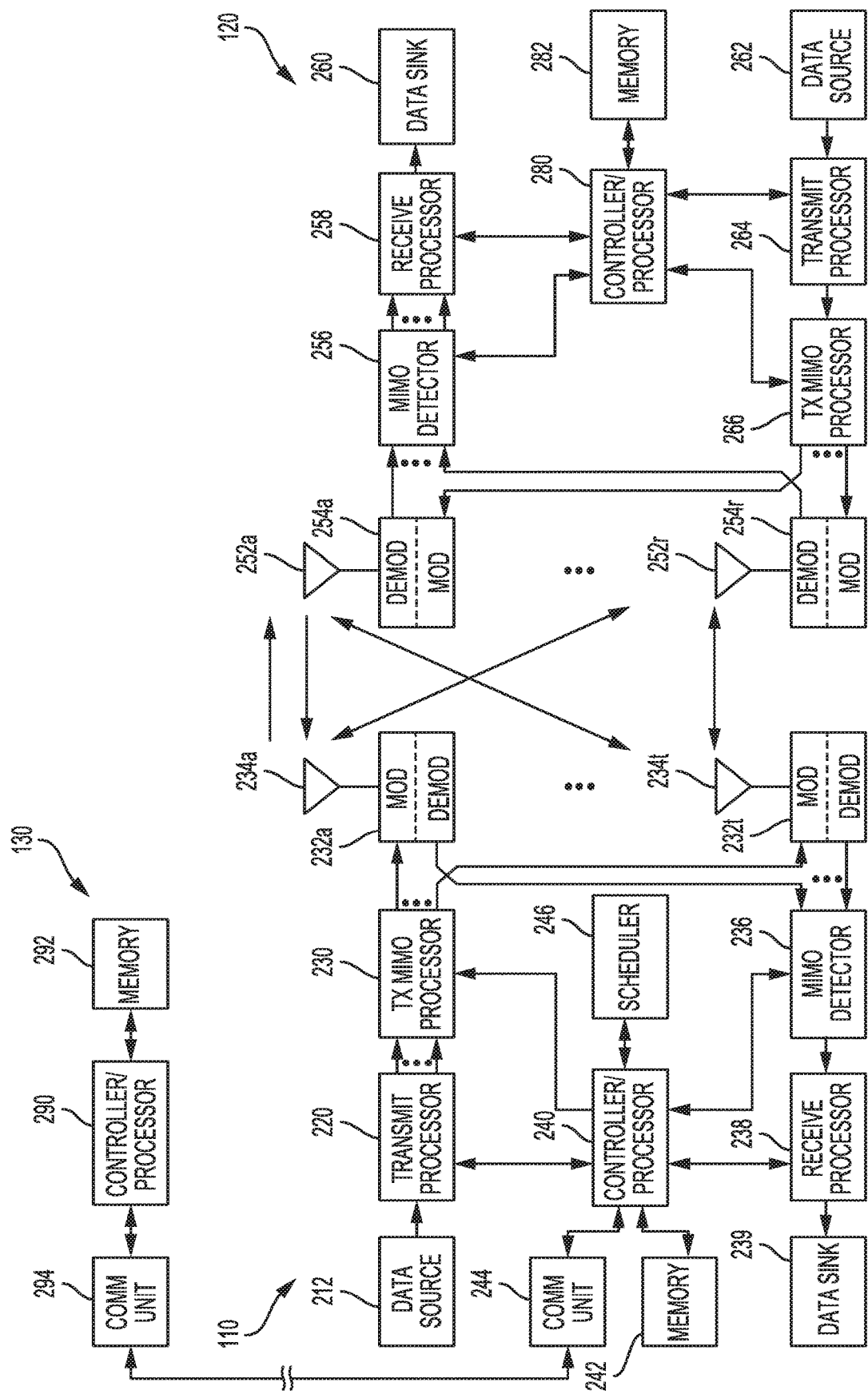
FIG. 2 is a block diagram of a design of a base station and a UE.

FIG. 2 is a block diagram of a design of NR BS 110 and UE 120, which may be one of the NR BS 110 and one of the UEs 120, respectively, in FIG. 1. NR BS 110 may be equipped with T antennas 234a through 234t, and UE 120 may be equipped with R antennas 252a through 252r.

At NR BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from NR BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to NR BS 110. At NR BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. NR BS 110 may include communication unit 244 and communicate to network controller 130 via communication unit 244. Network controller 130 may include communication unit 294, controller/processor 290, and memory 292.

Controllers/processors 240 and 280 may direct the operation at NR BS 110 and UE 120, respectively. For example, controller/processor 240 and/or other processors and modules at NR BS 110 may perform or direct operations and/or processes for techniques described herein. Similarly, controller/processor 280 and/or other processors and modules at UE 120 may perform or direct operations and/or processes for the techniques described herein (e.g., those illustrated in FIG. 6). Memories 242 and 282 may store data and program codes for NR BS 110 and UE 120, respectively. A scheduler 246 may schedule UEs for data transmission on the downlink and/or uplink.

Figure 3A:
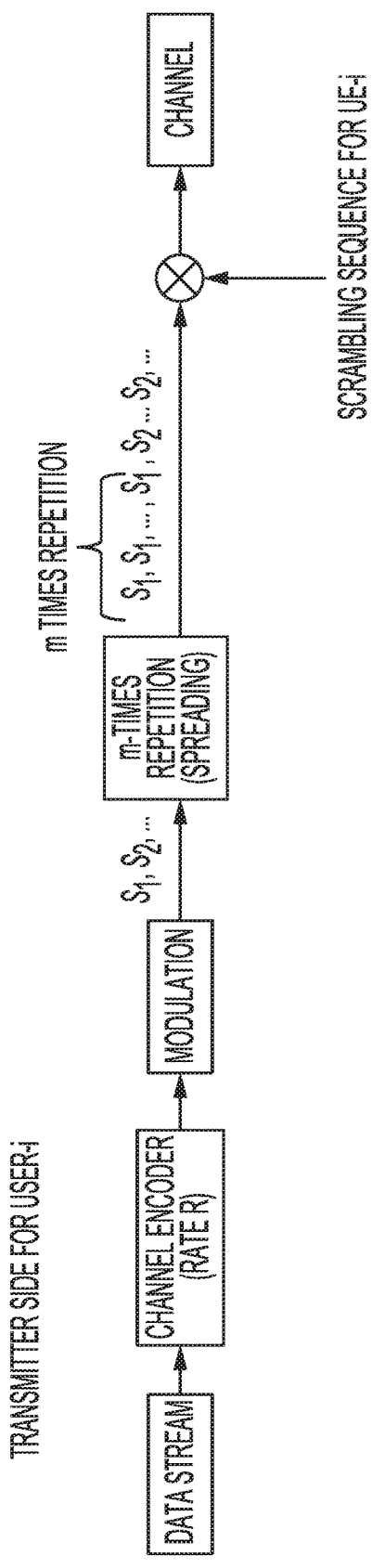
FIG. 3a is a block diagram illustrating an example of transmission modules for creating a physical waveform in accordance with some aspects of the present disclosure.

FIG. 3a is a block diagram illustrating an example of transmission modules for creating a physical waveform in accordance with some aspects of the present disclosure. The transmission modules of FIG. 3a can be used create a signal suitable for use in a wireless communication system such as described in FIG. 2.

The rate R Channel Encoder of the encoder system receives a stream of k information bits and outputs a larger stream of n coded bits wherein R is the code rate. The code rate R is the ratio of the number of information bits k per unit of time to the number of coded bits n per unit of time. Thus R=k/n. The n bits of coded bit stream at the output of the rate R Channel Encoder can then be received by the Modulation Unit which proceeds to convert the n bits into a stream of modulation symbols $s_1, s_2, s_3 \ldots$. The modulation symbols will be determined according to a selected modulation format, examples of which are QPSK, 16-QAM, 64-QAM, etc.

The modulation symbols $s_1, s_2, s_3 \ldots$ are then processed by a Repetition Unit that is configured to repeat the modulation symbols with p repetitions. The output of the Repetition Unit will be a stream of p repeated modulation symbols $s_1, s_1, \ldots, s_1, s_2, \ldots, s_2, s_3, \ldots, s_3, \ldots$.

Up to this point, the operations that are performed on the information bit stream are known to one of ordinary skill in the art. For future looking 5G NR, it is envisioned that UEs that are MTC device types will be coexisting on the same cell with UEs of other device types. Moreover, it is envisioned that large or massive numbers of these MTC device types, e.g., mMTC, will be supported in the same cell as other device types. One way of achieving this goal is to multiplex the transmissions of multiple MTC devices together in the same time and frequency resource. Multiplexing the transmissions of multiple devices using the same time and frequency resource can be achieved using scrambling codes.

A Scrambling Unit may be introduced to scramble the stream of p repeated modulation symbols $s_1, s_1, \ldots, s_1, s_2, \ldots, s_2, s_3, \ldots, s_3, \ldots$. The Scrambling Unit may receive scrambling information such as a scrambling sequence and multiply the stream of p repeated modulation symbols with the elements of the scrambling sequence. The scrambling sequence may be generated by a Sequence Generator Unit (not shown). A Scrambling Unit and a Sequence Generator Unit may be configured in accordance with the embodiments described in the present disclosure.

Low power UEs categorized as MTC, eMTC, or mMTC-type devices are typically designed with less complex hardware and less computational power. To address this design constraint, systems designed for these device types are ones where a limited number of short scrambling sequences are generated and for channelization purposes. For example, a set of L short scrambling sequences of length m could be composed of 6 short scrambling sequences of length 4. As repetition symbols are received for scrambling, the same short scrambling sequence is merely repeated for a particular UE. If each low power UE uses one scrambling sequence resource, then a system with the (L, m) design constraint of (6, 4) could only support the multiplexing of six (6) low power UEs. Higher numbers of low power UEs could not be supported.

The present disclosure addresses the code-limited situation by creating a pool of long scrambling sequences that are suitable for use in low power UEs. The present disclosure further envisions that the pool of long scrambling sequences can be efficiently and flexibly extended to support large, variable numbers of low power UEs by generating long scrambling sequences from short scrambling sequences. In one embodiment, a pool of N long scrambling sequences, each of length M, can be generated by concatenating portions of M/m short scrambling sequences.

As an example, FIG. 4a shows the assignment of six (6) short scrambling sequences (SS1, SS2, SS3, SS4, SS5, SS6) to six (6) low power UEs in a system where the serving base station, i.e., scheduling entity, is code limited to only 6 scrambling sequences. Due to the shortness of these sequences, they are repeated according to the repetition period configured by the scheduling entity for each low power UE. Since there are only six short scrambling sequences, no scrambling sequence is available for assignment to a seventh lower power UE which may start transmitting within the range of the serving base station.

To address this problem, the present disclosure offers techniques for generating a new long scrambling sequence that does not introduce unwanted hardware complexity in low power UEs but can be utilized on a large scale. In one embodiment, sections of each of the available scrambling sequences are concatenated together to form a long scrambling sequence. FIG. FIG. 4b shows the creation of two long scrambling sequences for UE1 and UE2.

For UE1, a long scrambling sequence is generated by concatenating a portion of SS1, a portion of SS2, a portion of SS3, a second portion of SS2, a second portion of SS3, and so forth up to length M. For UE2, a long scrambling sequence is generated by concatenating a portion of SS2, a portion of SS1, a portion of SS3, a portion of SS1, a portion of SS3, and so forth up to length M. There can be up to N long scrambling sequences generated in this manner. The number of portions that make up a long scrambling sequence would be M/m if each portion of SS(i) uses all m elements of SS(i).

Each portion of SS(i) is composed of consecutive elements of SS(i), and may comprise either a subset of the m elements of SS(i) or all of the m elements of SS(i). The interlaced arrangement of SS(i) portions which form a long scrambling sequence may be through specific extension patterns or by random/pseudo-random patterns.

Figure 3B:
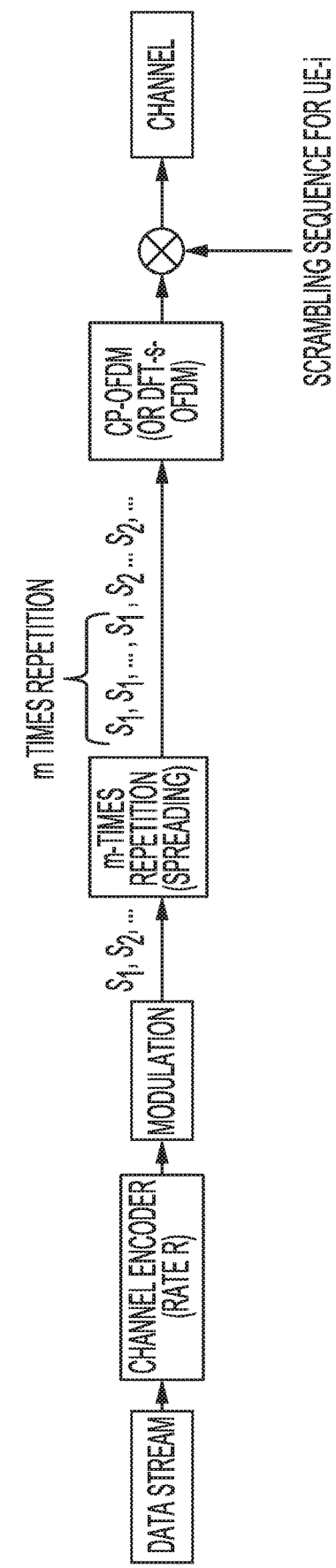
FIG. 3b is a block diagram illustrating another example of transmission modules for creating a physical waveform in accordance with some aspects of the present disclosure.
Figure 5:
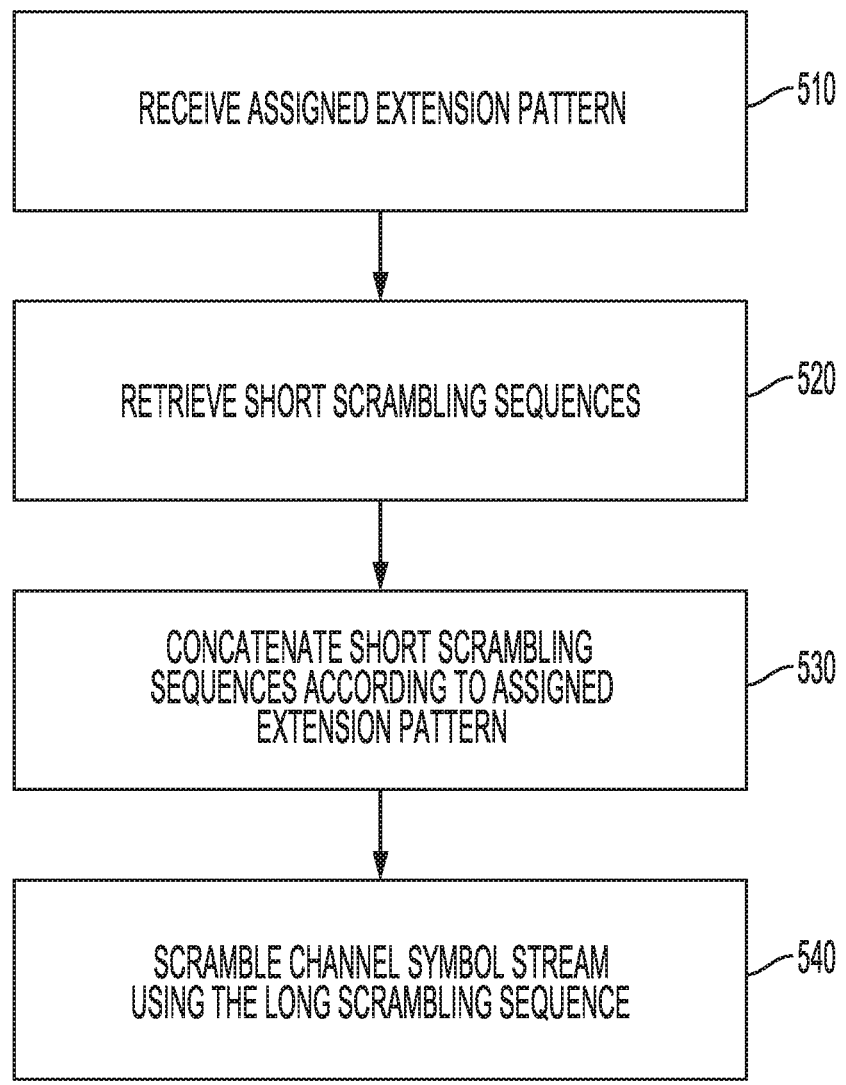
FIG. 5 is a flowchart illustrating an example method for generating a long scrambling sequence.

FIG. 5 is a flowchart illustrating an example method for generating and using a long scrambling sequence at a UE. At step 510, the UE receives an assigned extension pattern. At step 520, the Sequence Generator Unit of the UE retrieves a predetermined number of short scrambling sequences from memory. At step 530, the Sequence Generator Unit uses the assigned extension pattern to concatenate the short scrambling sequences together to form a long scrambling sequence. At step 540, the UE uses the long scrambling sequence to scramble channel symbols, an example of which is described in FIG. 3a or FIG. 3b. In one aspect of this embodiment, the UE uses a Scrambling Unit with at least one multiplier that is configured to receive the channel symbols and the long scrambling sequence and to output a scrambled channel symbol stream. The Scrambling Unit may be configured to have multiple multipliers and adders in order to support a complex multiply operation if the channel symbols and the long scrambling sequence comprise values with complex number representation. The Sequence Generator Unit may also be configured to include a phase rotator to rotate the elements of the newly formed long scrambling sequence before being output to the Scrambling Unit. FIG. 4c illustrates that after the Sequence Generator Unit concatenates the short scrambling sequences to form a long scrambling sequence, each short scrambling sequence can be multiplied with complex numbers, an example of which is phase rotation. This embodiment would be suitable when the physical waveform involves modulation by a CP-OFDM or DFT-s-OFDM module as described in FIG. 3b.

Figure 6:
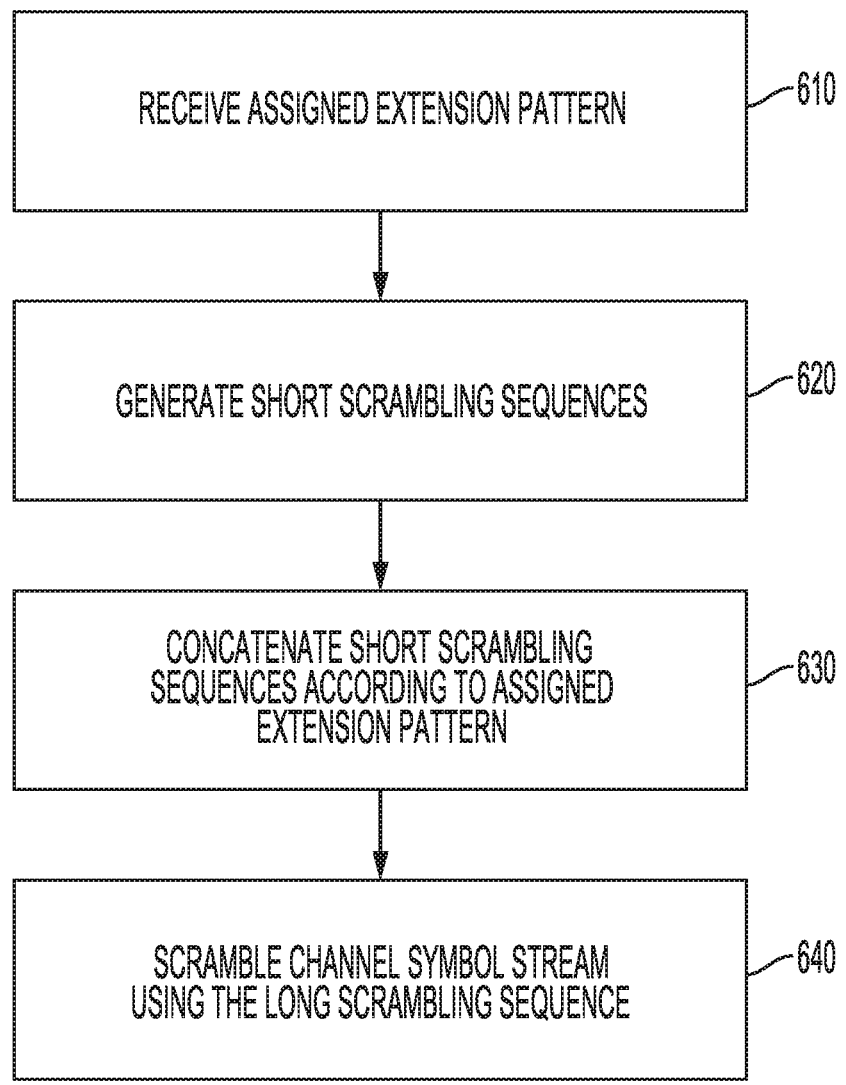
FIG. 6 is a flowchart illustrating another example method for generating a long scrambling sequence.

FIG. 6 is a flowchart illustrating another example method for generating and using a long scrambling sequence at a UE. At step 610, the Sequence Generator Unit of the UE receives an assigned extension pattern. At step 620, the Sequence Generator Unit generates the short scrambling sequences as needed using a sequence generator unit that comprises a plurality of linear feedback shift registers (LFSFs). At step 630, the Sequence Generator Unit uses the assigned extension pattern to concatenate the short scrambling sequences together to form a long scrambling sequence. At step 640, the UE uses the long scrambling sequence to scramble channel symbols as described in FIG. 3a or 3b. In one aspect of this embodiment, the UE uses a Scrambling Unit with at least one multiplier that is configured to receive the channel symbols and the long scrambling sequence and to output a scrambled channel symbol stream. The Scrambling Unit may be configured to have multiple multipliers and adders in order to support a complex multiply operation if the channel symbols and the long scrambling sequence comprise values with complex number representation. The Sequence Generator Unit may also be configured to include a phase rotator to rotate the elements of the newly formed long scrambling sequence before being output to the Scrambling Unit.

For one embodiment, the pool of long scrambling sequences can be generated using elements of short scrambling sequences where the elements may be real or complex numbers. For the example of L short scrambling sequences of length m, the elements of the short scrambling sequences SS(i) can be represented as:

$$SS1 = [s_{11}, s_{12}, \ldots, s_{1m}],$$
$$SS2 = [s_{21}, s_{22}, \ldots, s_{2m}],$$
$$\ldots,$$
$$SSL = [s_{L1}, s_{L2}, \ldots, s_{Lm}].$$

Then $s_{ij}$ may be a real number, or a complex number format that is representative of an exponential expression, or representative of PSK, QPSK, or other n-ary QAM modulation formats, or other types of numerical representation.

In one embodiment, an extension pattern can be used to generate N long scrambling sequences from the L short scrambling sequences. For example, let ESS(i) represent the $i^{th}$ extension pattern:

$$ESS1 = [e_{11}, e_{12}, \ldots, e_{1\,M/m}],$$
$$ESS2 = [e_{21}, e_{22}, \ldots, e_{2\,M/m}],$$
$$\ldots,$$
$$ESSN = [e_{N1}, e_{N2}, \ldots, e_{N\,M/m}],$$

where $e_{ij}$ represents a short scrambling sequence from the set of L short scrambling sequences {SS1, SS2, . . . , SSL}.

For generating the pool of long scrambling sequences, the elements in the extension pattern is replaced with the corresponding short scrambling sequence. For example, if the ESS1 has the extension pattern [2, 1, 3, . . . ], then the final long scrambling sequence will have the form ESS1= [$s_{21}$, $s_{22}$, . . . , $s_{2m}$, $s_{11}$, $s_{12}$, . . . , $s_{1m}$, $s_{31}$, $s_{32}$, . . . , $s_{3m}$, . . . ], wherein the numerical value i in the extension pattern of this example corresponds to the short scrambling sequence SS(i).

In one embodiment, the design of the extension patterns for the pool of long scrambling sequences should meet at least one criteria; minimize the cross-correlation across different long scrambling sequences. One exemplary technique for minimizing the cross-correlation across the long scrambling sequences is to maximize the Hamming distances between the extension patterns.

In one embodiment, the extension patterns are designed to further satisfy an additional criterion; optimize a collision rate d, as represented by:

$$d = \frac{1}{\binom{M}{2}} \frac{1}{L} \sum_{i,i'} \sum_{j=1}^{L} 1_{\{c_{ij} = c_{i'j}\}}$$

For M sequences with a block size of L and a codebook size of 6, the lower bound for this optimization metric is:

$$d \geq \frac{\frac{M}{6} - 1}{M - 1}$$

When M is high, e.g., 100, the collision rate is close to ⅙. Therefore, for independent and identically distributed random extension patterns, the distribution is close to optimal for large numbers of UEs.

An example of how to generate a pool of long scrambling sequences that satisfy at least the two aforementioned criteria is as follows:

Given the following extension patterns:

$$\text{Extension pattern } ESS1 = [e_{11}, e_{12}, \ldots, e_{1\ M/m}],$$
$$\ldots,$$
$$\text{Extension pattern } ESSN = [e_{N1}, e_{N2}, \ldots, e_{N\ M/m}], \text{ let } N = 12, L = 6.$$

Then the elements $\{e_{1i}, e_{2i}, \ldots, e_{12\ i}\}$ which would correspond to the short scrambling sequences assigned to the N UEs at a specific time instance t (or slot t) could be generated as a permutation of $\{1, 1, 2, 2, 3, 3, 4, 4, 5, 5, 6, 6\}$. In other words, the elements of the set $\{1, 1, 2, 2, 3, 3, 4, 4, 5, 5, 6, 6\}$ refer to the short scrambling sequences that will be used by each of the 12 UEs at a particular time instance t. To satisfy the aforementioned criteria, the elements of this set should be permuted. A scheduling entity that is making the decision to generate a pool of extension patterns should take this criteria under consideration.

In another example, let N=13, L=6. Then $\{e_{1i}, e_{2i}, \ldots, e_{Ni}\}$ could be generated as a permutation of
$\{1, 1, 1, 2, 2, 3, 3, 4, 4, 5, 5, 6, 6\}$ or
$\{1, 1, 2, 2, 3, 3, 4, 4, 5, 5, 6, 6, 6\}$ or
$\{1, 1, 2, 2, 3, 3, 4, 4, 5, 5, 6, 6, 6\}$.

Due to the small set of short scrambling sequences, repetition of some short scrambling sequences will occur between UEs at a given time instance t when there are many more UEs than short scrambling sequences. To minimize the impact of the repetition effect, such repetitions should occur in a planned manner. For example, at the same time instance, the Hamming distance between extension patterns across the UEs can be maximized. To achieve this goad, each repetition of element $\{e_{ij}\}$ can be arranged with equal or almost equal frequency for each index i, j. However, at different time instances, different permutations of an extension pattern $\{e_{ij}\}$ should be used.

In a 5G NR system, one frame comprises two half frames, and each half frame comprises 5 subframes. Each subframe will be 1 ms in duration. It is envisioned that for 5G NR, the number of slots per subframe may be configurable in accordance to the type of 5G device that is being served. However, low power UEs of the same device types will be expected to use the same slot configuration parameters. In one embodiment, an assignment pattern is laid out so that a first low power UE is assigned the same extension pattern element as a second lower power UE in the same slot duration. In all other slots, different extension pattern elements are assigned. FIG. 7a describes an example of this embodiment where L=6, N=7.

In FIG. 7a, seven low power UEs are configured to generate and use seven different long scrambling sequences. However, the seven different long scrambling sequences are designed so that at one particular slot, they share the same extension pattern element $e_{ij}$ for scrambling with one other long scrambling sequence. In this embodiment, all other low power UEs are assigned extension pattern elements in that particular slot that are different from $e_{ij}$.

FIG. 7b provides a specific scrambling configuration with numerical examples to aid in understanding of this embodiment.

In this example, UE1 is configured to scramble symbols with Extension pattern 1. UE2 is configured to scramble symbols with Extension pattern 2. In accordance with one aspect of the embodiments, the UE1 and UE2 both scramble symbols with extension pattern element "1", i.e., short scrambling sequence 1, at slot 1. No other UE will be scrambling with short scrambling sequence 1 at this slot duration. At slot 2, UE 1 and UE 3 will both scramble symbols at extension pattern element "1". No other UE will be scrambling with at extension pattern element "1" at this slot duration. At slot 3, UE1 and UE4 will be scrambling symbols using at extension pattern element "2." No other UE will be scrambling with at extension pattern element "2" during this slot duration.

Figure 8:
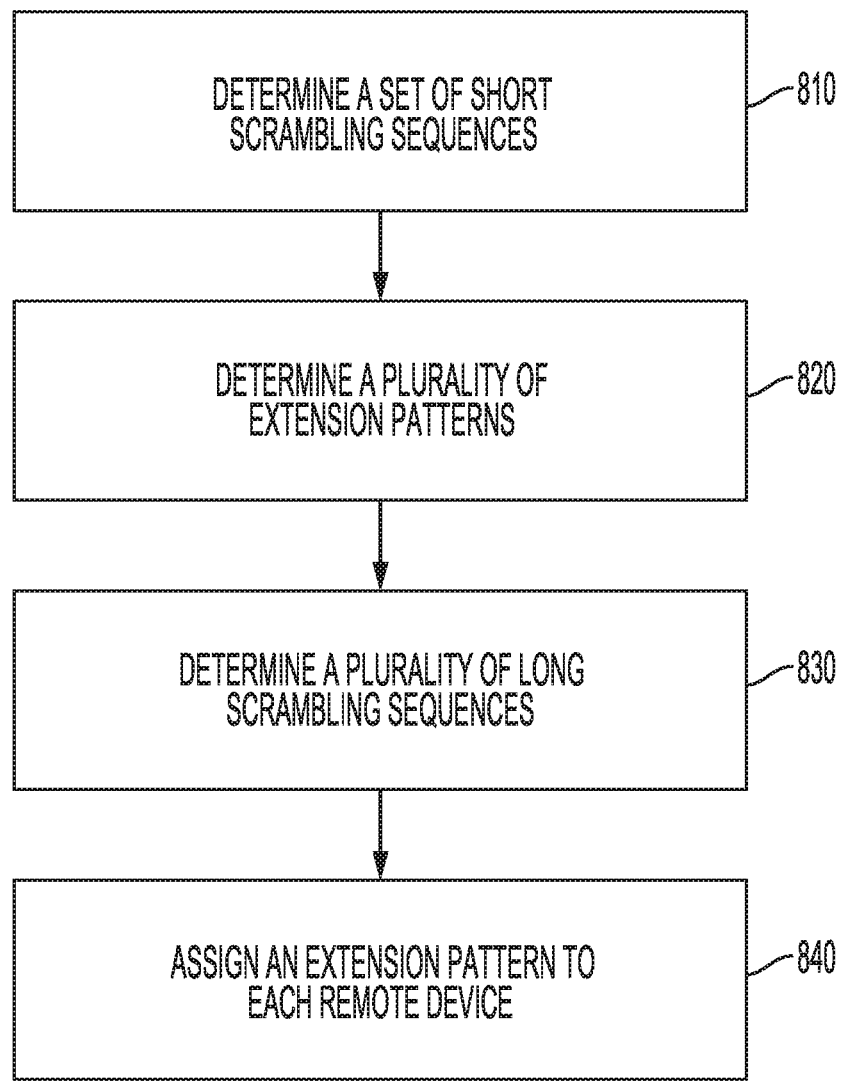
FIG. 8 is a flowchart for generating a pool of extension patterns to support a plurality of UEs.

FIG. 8 is a flowchart that illustrates how a scheduling entity, such as a base station for example, can generate a pool of long scrambling sequences. At step 810, the scheduling entity determines a set of short scrambling sequences to be used to support low power UEs, e.g., MTC-type devices. The set may be determined using pre-populated look up tables or other information stored in local memory. Alternatively, the set may be determined "on-the-fly" by using a sequence generation formula with an appropriate seed. At step 820, the scheduling entity determines a plurality of extension patterns. The extension patterns may be determined using pre-populated look up tables or other information stored in local memory. Alternatively, the extension patterns may be determined by using quasi-unique information that is used to generate the extension patterns. The quasi-unique information may be device identification information, either specific or generic, or assignment of locally generated sequence values.

At step 830, the scheduling entity determines a plurality of long scrambling sequences, each long scrambling sequence being generated by concatenating short scrambling sequences of the set of short scrambling sequences according to each extension pattern of the plurality of extension patterns. This pool of long scrambling sequences may be designed by the scheduling entity in accordance with the criteria that the cross-correlation between the long scrambling sequences is minimized. This pool of long scrambling sequences may also be designed in accordance with the criteria that at any particular time instance, e.g., slot, a minimal number of long scrambling sequences will have the same short scrambling sequence as another long scrambling sequence. In one aspect, the minimal number is dependent upon the number of low power UEs registered with the schedule entity. Additionally, or alternatively, the minimal number may be based upon the number of elements within each short sequence. The location and frequency of a short scrambling sequence in the extension pattern may be part of the criteria that is taken into consideration by a scheduling entity when designing a pool of extension patterns.

At step 840, the scheduling entity assigns an extension pattern to each low power UE. Optionally, the scheduling entity may transmit this assignment information to the low power UEs as described in the embodiments that follow.

Figure 9:
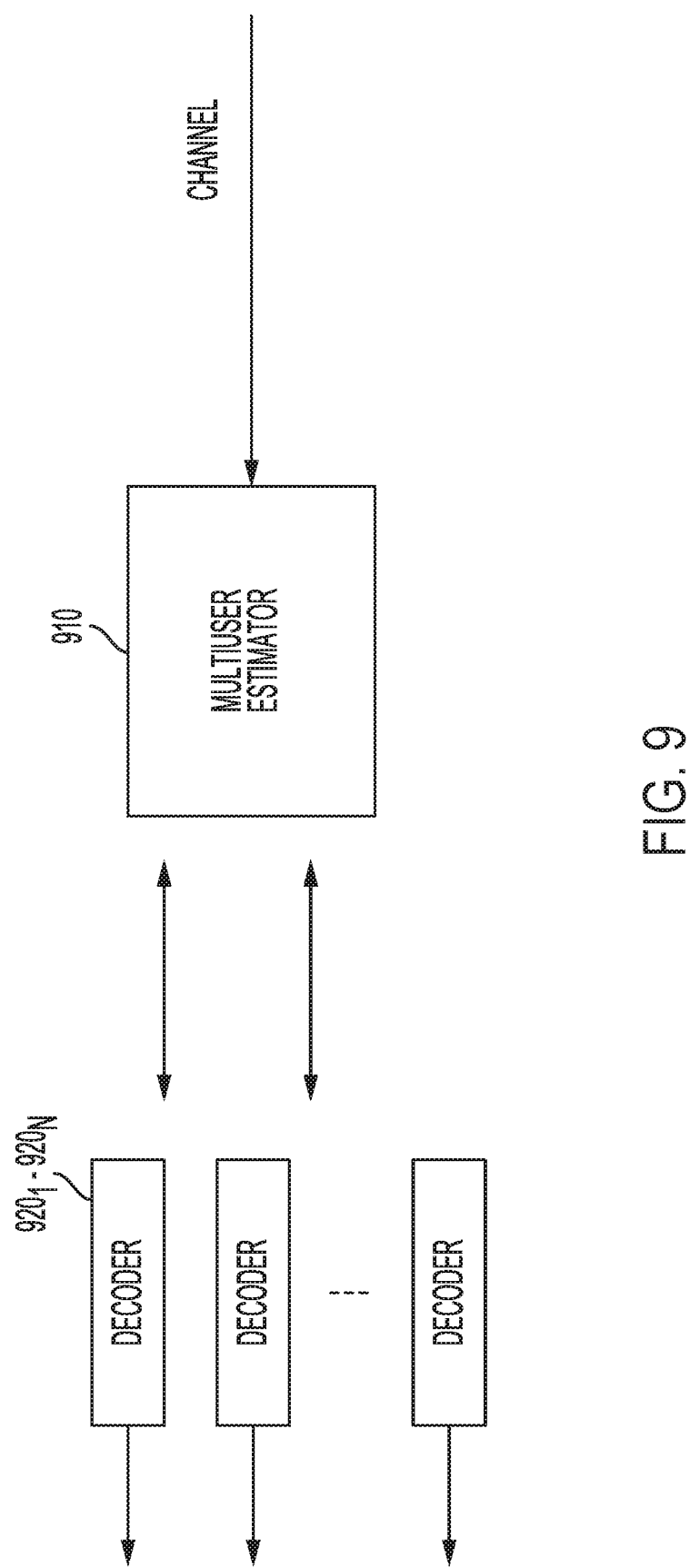
FIG. 9 is a block diagram illustrating an example of reception modules for processing a physical waveform in accordance with some aspects of the present disclosure.

FIG. 9 is a block diagram illustrating an example of reception modules for processing a physical waveform in accordance with some aspects of the present disclosure. The reception modules may be incorporated into the operations of the DEMODs 232, MIMO detector 236, receive processor 238, and controller 240 of the NR BS 110 of FIG. 2. The uplink signal is received by the scheduling entity and then processed by Multiuser Estimator 910. Multiuser Estimator 910 is typically part of DEMODs 232 but may be implemented as a separate unit. Because 5G NR is envisioned to support many device types, Multiuser Estimator 910 may be configured to support many different techniques for receiving a signal, including but not limited to matched filter designs, MMSE estimation, and elementary signal estimator designs. An embodiment of Multiuser Estimator 910 that comprises matched filter techniques would further incorporate de-scrambling units to de-scramble the received signal. The output of the Multiuser Estimator 910 would be multiple UE signals that would be individually decoded by Decoder Units $920_1$-$920_N$.

The embodiments described previously address the mechanics of creating long scrambling sequences for low power UEs that may not be typically configured to generate long scrambling sequences. In addition to the generation of a long scrambling sequence, further embodiments disclose how to utilize the long scrambling sequences to improve system performance.

In an alternative approach, the situation may arise where the number of short scrambling sequences is greater than the number of low power UEs, hence, the need for using long scrambling sequences is lessoned. In one embodiment, the scheduling entity, e.g., gNB, may be configured to down-select the number of long scrambling sequences or the number of short scrambling sequences. Down selection can also occur by using fewer than the m elements in the predetermined number of short scrambling sequences with parameters (L, m), where L is the predetermined number of short scrambling sequences and m is the number of elements within each short scrambling sequence. The resulting information can then be transmitted to the served devices through a configuration message or an upper layer messaging procedure, such as RRC messaging.

In one aspect of the embodiments, assignments of the long or short scrambling codes may be grant-based. In other words, a scheduling entity that supports the scrambling sequence generation techniques described herein may be coordinating the network resources available to the device types which are served by the scheduling entity. Procedures for grant-based transmissions on the uplink are generally known in the art and will not be described herein.

Because the communication resources are being granted by the scheduling entity, specific assignments of different long or short scrambling sequences may be made for each UE covered by the scheduling entity. In some instances, the scheduling entity may assign scrambling sequences to multiple UEs but limit the UEs to operate on fewer resource elements than the number of UEs. For example, the scheduling entity may grant six scrambling sequences to six low power UEs, but the multiplexing is scheduled over four (4) REs (Resource Elements). In the case where the system may be code limited to six (6) short scrambling sequences, scheduling over four (4) REs would be an overload of 150%.

In another aspect of the embodiments, no grants of the long or short scrambling codes are made by a scheduling entity. This grant-less transmission scenario is envisioned for low power MTC/mMTC device types. As described above, the embodiments are for generating N long scrambling sequences from L short scrambling sequences. In the specific environment where the scheduling entity will allow grant-less uplink transmissions, it may be assumed that a low power UE will not be transmitting simultaneously with many other low power UEs due to the inherent nature of a low power, IoT-type device; only a few IoT-type devices would be transmitting at any given point of time. In one embodiment, the low power UE may be configured to generate a long scrambling sequence in accordance with some predetermined information, e.g., UE identity information. Hence, this embodiment is directed towards generation of long scrambling sequences using self-selected assignments. If there is generation of the same long scrambling sequence as another low power UE, then due to the expected sparseness of the device transmissions, there should be little interference between the two. If the situation arises were there are too many collisions between the low power UEs, then a fall back mechanism may be designed to allow the low power UE to generate a different long scrambling sequence, for example, a different seed other than the UE identity information or a different portion of the UE identity information.

Figure 10:
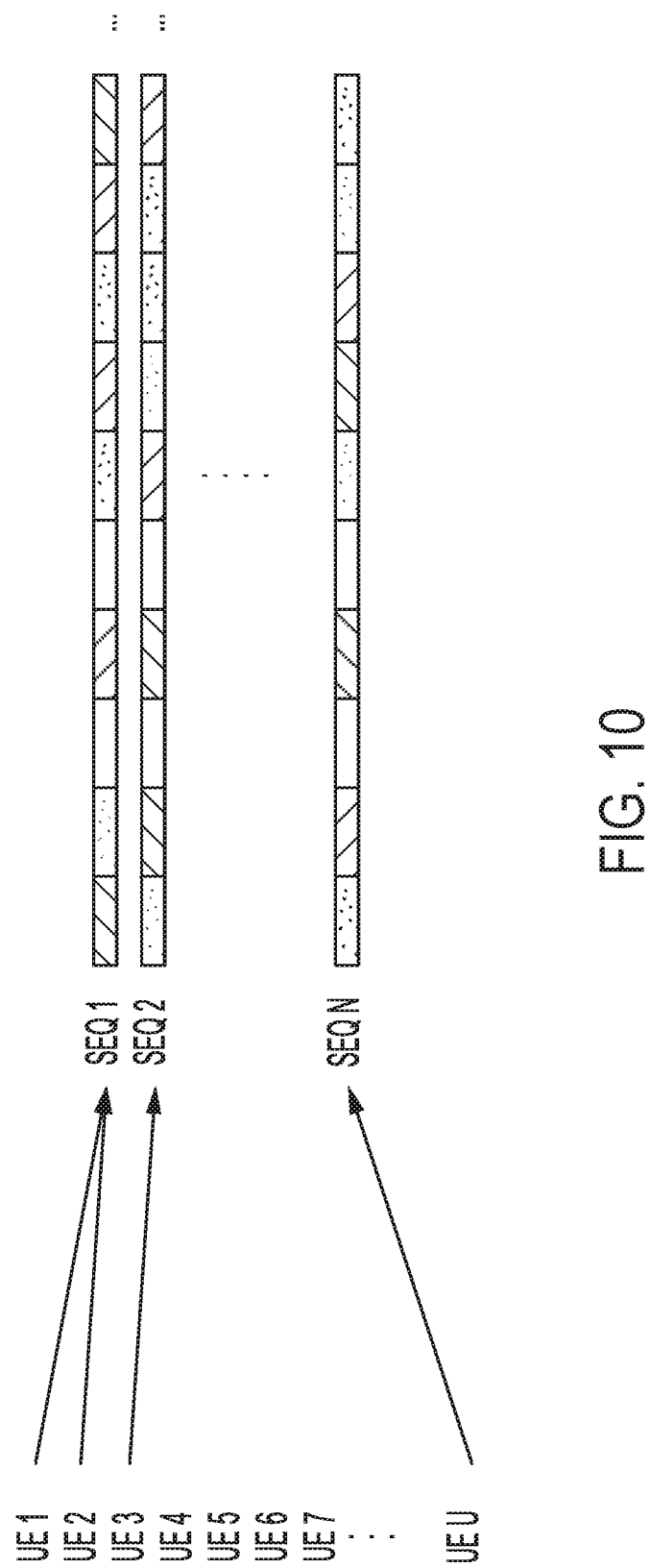
FIG. 10 illustrates an example of long sequence assignments to a plurality of UEs.

FIG. 10 describes the situation that may arise where many UEs are generating long scrambling sequences.

In this example, UE1, UE2, . . . , UEU are generating N long scrambling sequences using L short scrambling sequences in accordance with the embodiments described previously. Each long scrambling sequence may be expressed by an extension pattern of alphabet size L, e.g., if L=6, then a possible extension pattern could be [1, 6, 2, 4, 4, 5 . . . ]. Since U>N in this example, at least two of the low power UEs share the same long scrambling sequence. Through empirical observation, only a few of the low power UEs would be actively transmitting at any given point of time. If the UE ID is being used as a seed to generate the long scrambling sequence, then the UE IDs of the low power UEs should be pre-registered with the scheduling entity so that the scheduling entity can descramble the received uplink transmissions appropriately.

In the scenario where the U≤N, then the low power UEs would not need to share long scrambling sequences.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more antennas, such as antenna(s) 234 of the eNB 110 and/or antenna(s) 252 of the user equipment 120. Additionally, means for transmitting may comprise one or more processors (e.g., Transmit Processors 220/264 and/or Receive Processors 238/258) configured to transmit/receive via the one or more antennas. Further, means for determining, means for deciding, means for using, and/or means for performing may comprise one or more processors, such as the Transmit Processor 220, the Receive Processor 238, or the Controller/Processor 240 of the eNB 110 and/or the Transmit Processor 264, the Receive Processor 258, or the Controller/Processor 280 of the user equipment 120.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the term receiver may refer to an RF receiver (e.g., of an RF front end) or an interface (e.g., of a processor) of a UE (e.g., UE 120) or BS (e.g., eNB 110) for receiving structures processed by an RF front end (e.g., via a bus). Similarly, the term transmitter may refer to an RF transmitter of an RF front end or an interface (e.g., of a processor) of a UE (e.g., UE 120) or BS (e.g., eNB 110) for outputting structures to an RF front end for transmission (e.g., via a bus). According to certain aspects, a receiver and transmitter may be configured to perform operations described herein. Additionally a transmitter may be configured to perform any transmitting functions described herein such as transmitting information associated with one or more PRSs scheduled in different bandwidths.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus in a wireless communications system, comprising:
    a sequence generator unit configured to receive a predetermined number of short scrambling sequences and to receive an assigned extension pattern for the apparatus from a scheduling agent,
    wherein the sequence generator unit is configured to generate a long scrambling sequence by concatenating the predetermined number of short scrambling sequences according to the assigned extension pattern, wherein each of the number of short scrambling sequences includes a plurality of elements, and
    wherein the assigned extension pattern includes a sequence of elements that each indicate one of the predetermined number of short scrambling sequences to determine the order in which the short scrambling sequences are concatenated to form the long scrambling sequence; and
    a scrambling unit configured to receive the long scrambling sequence from the sequence generator unit and to scramble a channel symbol stream with the received long scrambling sequence,
    wherein the assigned extension pattern for the apparatus is one of a plurality of extension patterns generated by a processor in the scheduling agent,
    where the locations of each short scrambling sequence in each of the plurality of extension patterns is arranged to minimize the cross-correlation between long scrambling sequences produced by each of the plurality of extension patterns,
    where location of a first short scrambling sequence in a first extension pattern of the plurality of extension patterns aligns with the location of the first short scrambling sequence in a second extension pattern of the plurality of extension patterns and the first short scrambling sequence is in non-aligned locations of other extension patterns in the plurality of extension patterns.

2. The apparatus of claim 1, further comprising:
    RF circuitry configured to receive a message from a scheduling entity; and
    a receive processor configured to decode the received message, determine whether information in the received message is indicative of the assigned extension pattern, and if information is indicative of the assigned extension pattern, signal the sequence generator unit to generate the long scrambling sequence in accordance with the assigned extension pattern.

3. The sequence generator unit of claim 2, further comprising:
at least one input for receiving information indicative of the assigned extension pattern from the receive processor and for receiving the predetermined number of short scrambling sequences.

4. The apparatus of claim 1, wherein each element of the long scrambling sequence has a complex number representation.

5. The apparatus of claim 4, wherein the scrambling unit is further configured to perform a complex multiply operation.

6. The apparatus of claim 3, further comprising:
a memory unit configured to store the predetermined number of short scrambling sequences, the memory unit operably coupled to the at least one input of the sequence generator unit.

7. The sequence generator unit of claim 1, wherein the sequence generator unit is further configured to generate the predetermined number of short scrambling sequences.

8. The scrambling unit of claim 1, comprising at least one multiplier configured to multiply each channel symbol of the channel symbol stream with an element of the long scrambling sequence.

9. The sequence generator unit of claim 1, further comprising a phase rotator.

10. A method for scrambling a channel symbol stream in a transmitter of wireless communications system, comprising:
determining a predetermined number of short scrambling sequences, each of the predetermined number of short scrambling sequences including a plurality of scrambling elements;
receiving an assigned extension pattern for the transmitter from a scheduling entity, the assigned extension pattern including a sequence of elements each indicating one of the predetermined number of short scrambling sequences;
concatenating the predetermined number of short scrambling sequences in the order indicated by the elements in the assigned extension pattern to form a long scrambling sequence; and
scrambling the channel symbol stream using scrambling symbols of the long scrambling sequence,
wherein the assigned extension pattern for the apparatus is one of a plurality of extension patterns generated by a processor in the scheduling agent,
where the locations of each short scrambling sequence in each of the plurality of extension patterns is arranged to minimize the cross-correlation between long scrambling sequences produced by each of the plurality of extension patterns, where location of a first short scrambling sequence in a first extension pattern of the plurality of extension patterns aligns with the location of the first short scrambling sequence in a second extension pattern of the plurality of extension patterns and the first short scrambling sequence is in non-aligned locations of other extension patterns in the plurality of extension patterns.

11. The method of claim 10, wherein determining the predetermined number of short scrambling sequences comprises
receiving the predetermined number of short scrambling sequences from a scheduling entity.

12. The method of claim 10, wherein each short sequence of the predetermined number of short scrambling sequences comprises an element with a complex number representation.

13. The method of claim 12, wherein the complex number representation is an exponential representation.

14. The method of claim 12, wherein the complex number representation is a modulation format.

15. The method of claim 10, further comprising:
transmitting information indicative of a device identification, wherein the assigned extension pattern is assigned based on the information.

16. The method of claim 10, wherein determining the predetermined number of short scrambling sequences comprises retrieving the predetermined number of short scrambling sequences from a local memory.

17. The method of claim 10, wherein determining the predetermined number of short scrambling sequences comprises generating the predetermined number of short scrambling sequences locally in the transmitter.

18. The method of claim 10, further comprising:
multiplying the scrambling symbols of the long scrambling sequence by a complex number before scrambling the channel symbol stream.

19. A method for generating a scrambling sequence in a wireless communications system, comprising:
determining a set of short scrambling sequences, each of the set of short scrambling sequences including a plurality of scrambling elements;
determining a plurality of extension patterns, each of the plurality of extension patterns includes elements that each indicate one short scrambling sequence of the set of short scrambling sequences;
determining a plurality of long scrambling sequences, each long scrambling sequence being determined by concatenating short scrambling sequences of the set of short scrambling sequences according to the elements of each extension pattern of the plurality of extension patterns; and
assigning an assigned extension pattern from the plurality of extension patterns to each of a plurality of remote devices,
wherein determining the plurality of extension patterns further comprises arranging the locations of each short scrambling sequence in each extension pattern to minimize the cross-correlation between each long scrambling sequence of the plurality of long scrambling sequences, and
wherein arranging the locations of each short scrambling sequence in each extension pattern comprises:
selecting a location of a first short scrambling sequence within a first extension pattern to align with a location of the first short scrambling sequence within a second extension pattern; and
selecting non-aligned locations for the first short scrambling sequence in other extension patterns.

20. The method of claim 19, wherein determining the plurality of extension patterns comprises:
determining quasi-unique information for each of a plurality of remote devices, each remote device being capable of machine type communications, the quasi-unique information being a device information for the transmitter or assignment of a sequence generated locally in the transmitter; and
using the quasi-unique information to generate the plurality of extension patterns.

21. The method of claim 20, further comprising:
transmitting a message to the plurality of remote devices, wherein the message contains information indicative of assigned extension patterns.

22. The method of claim 20, further comprising:
multiplying a received symbol stream with each long scrambling sequence of the plurality of long scrambling sequences to form a plurality of individual scrambled streams, each associated with a remote device.

23. The method of claim 19, wherein arranging the locations of each short scrambling sequence in each extension pattern comprises:
for each extension pattern, repeating each short scrambling sequence within the extension pattern.

24. The method of claim 19, wherein each location corresponds to an assigned time slot.

25. The method of claim 24, wherein each location corresponds to an assigned frequency resource.

26. An apparatus in a wireless communications system, comprising:
means for receiving an assigned extension pattern, the assigned extension pattern associated with the apparatus, wherein the assigned extension pattern includes elements that each indicate one of a predetermined number of short scrambling sequences;
means for generating a long scrambling sequence from the predetermined number of short scrambling sequences, wherein the long scrambling sequence is generated by concatenating the predetermined number of short scrambling sequences according to the elements of the assigned extension pattern; and
means for receiving the long scrambling sequence from the generator; and
means for scrambling a channel symbol stream with the received long scrambling sequence,
wherein the assigned extension pattern for the apparatus is one of a plurality of extension patterns generated by a processor in the scheduling agent,
where location of a first short scrambling sequence in a first extension pattern aligns with the location of the first short scrambling sequence in a second extension pattern and the first short scrambling sequence is in non-aligned locations of other extension patterns in the plurality of extension patterns.

* * * * *